United States Patent
Desai

(10) Patent No.: US 10,636,276 B2
(45) Date of Patent: Apr. 28, 2020

(54) CABIN ACTIVITY DETECTION DEVICE

(71) Applicant: Manish Desai, Houston, TX (US)

(72) Inventor: Manish Desai, Houston, TX (US)

(*) Notice: Subject to any disclaimer, the term of this patent is extended or adjusted under 35 U.S.C. 154(b) by 0 days.

(21) Appl. No.: 16/104,426

(22) Filed: Aug. 17, 2018

(65) Prior Publication Data

US 2019/0057596 A1    Feb. 21, 2019

Related U.S. Application Data

(60) Provisional application No. 62/546,838, filed on Aug. 17, 2017.

(51) Int. Cl.
| | | |
|---|---|---|
| *G08B 21/24* | (2006.01) | |
| *G08B 21/18* | (2006.01) | |
| *B60Q 9/00* | (2006.01) | |
| *G06K 9/00* | (2006.01) | |
| *A45C 13/24* | (2006.01) | |
| *B60Q 5/00* | (2006.01) | |
| *G08B 21/22* | (2006.01) | |

(52) U.S. Cl.
CPC .............. *G08B 21/24* (2013.01); *A45C 13/24* (2013.01); *B60Q 5/005* (2013.01); *B60Q 9/00* (2013.01); *G06K 9/00832* (2013.01); *G08B 21/182* (2013.01); *G08B 21/22* (2013.01)

(58) Field of Classification Search
CPC ...... G08B 21/24; G08B 21/182; G08B 21/22; A45C 13/24; B60Q 5/005; B60Q 9/00; G06K 9/00832

USPC ........................................................ 340/457
See application file for complete search history.

(56) References Cited

U.S. PATENT DOCUMENTS

| | | | | |
|---|---|---|---|---|
| 9,676,325 | B1* | 6/2017 | Duan | B60Q 9/00 |
| 10,239,491 | B1* | 3/2019 | Crider | B60R 25/241 |
| 2002/0161501 | A1* | 10/2002 | Dulin | B06B 1/0215 |
| | | | | 701/45 |
| 2016/0049061 | A1* | 2/2016 | Scarborough | B60N 2/002 |
| | | | | 340/449 |
| 2016/0082923 | A1* | 3/2016 | Gavriel | B60R 22/48 |
| | | | | 340/438 |
| 2016/0185317 | A1* | 6/2016 | Bambico | A61B 5/6893 |
| | | | | 340/457 |
| 2016/0200168 | A1* | 7/2016 | Boyer | H04R 19/04 |
| | | | | 701/45 |
| 2017/0190287 | A1* | 7/2017 | Gjoni | G08B 21/24 |
| 2018/0354443 | A1* | 12/2018 | Ebrahimi | B60R 22/105 |

* cited by examiner

*Primary Examiner* — Kerri L McNally
(74) *Attorney, Agent, or Firm* — Chamberlain, Hrdlicka, White, Williams & Aughtry

(57) ABSTRACT

A method system, and non-transitory computer readable medium for cabin activity detection. In one or more embodiments of the invention, the method includes receiving first sensor data at a cabin activity detection device from a first sensor of a plurality of sensors; performing, by the cabin activity detection device, local analysis of the first sensor data to make a determination that a condition is met; and performing a first local action based on the determination that the condition is met.

12 Claims, 5 Drawing Sheets

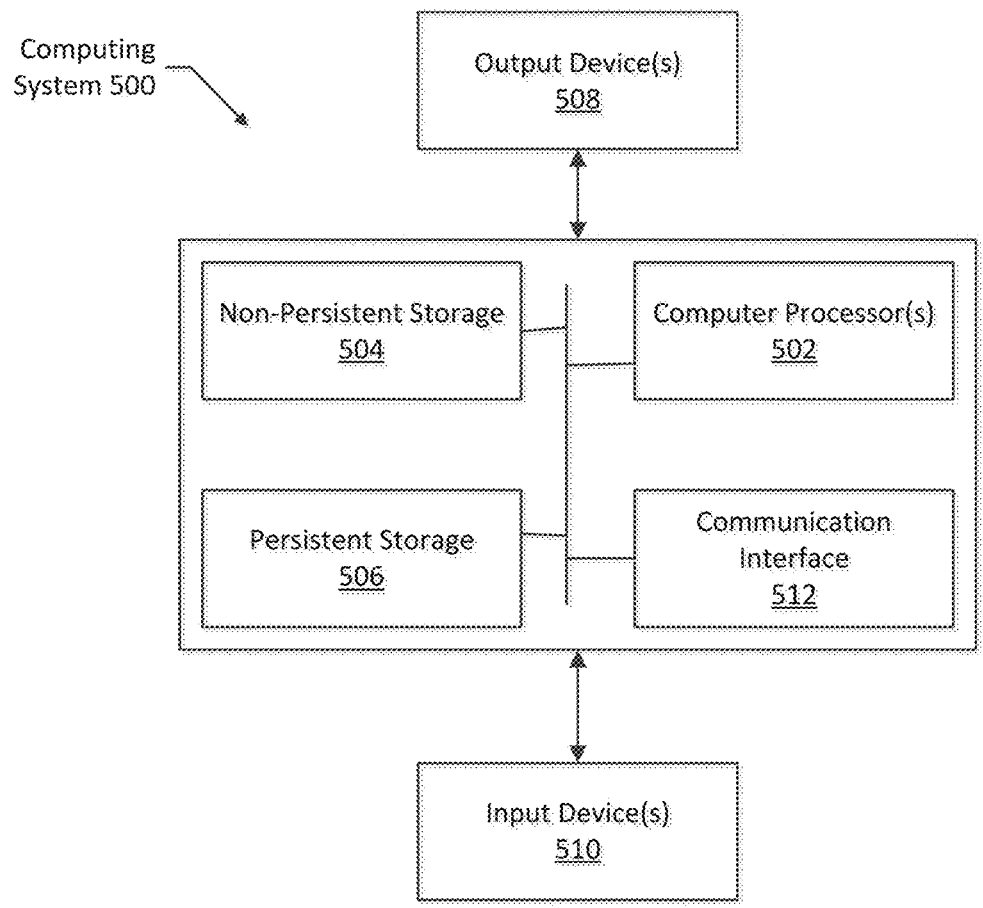
FIG. 5.1
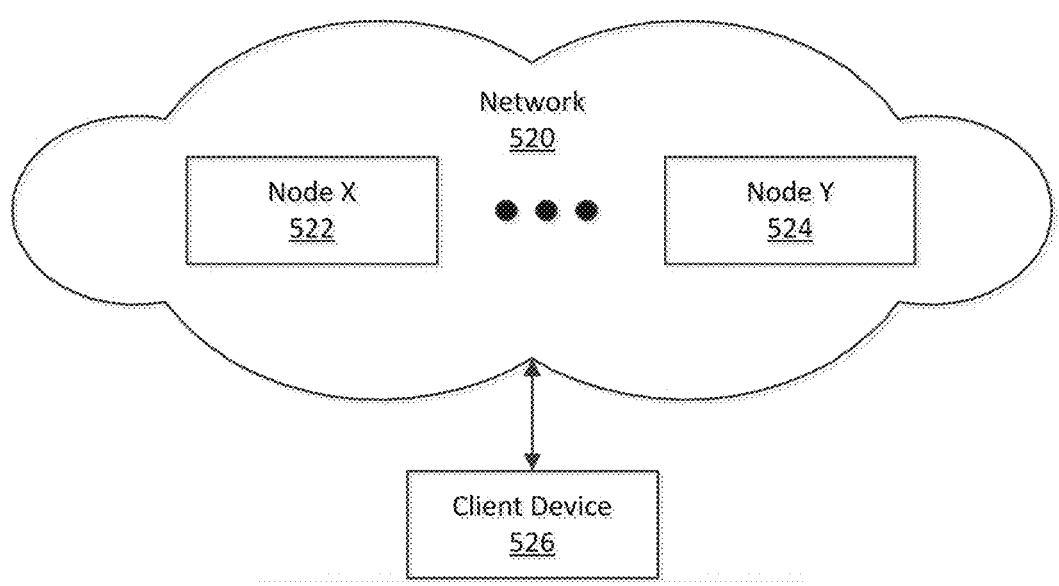
FIG. 5.2

CABIN ACTIVITY DETECTION DEVICE

BACKGROUND

Vehicles (e.g., automobiles) often have enclosed cabins in which the driver and any passengers (e.g., humans, pets, etc.) or other items (e.g., purses, luggage, etc.) may be while the vehicle is (or is not) traveling. In some scenarios, when the vehicle stops traveling, there may exist a situation in the cabin (e.g., item left behind, sound occurs) that some other entity (e.g., the driver, vehicle owner, etc.) may be interested in knowing about and/or for which the entity may be interested in taking action to remedy.

SUMMARY

In general, in one aspect, the invention relates to a method for cabin activity detection. The method includes receiving first sensor data at a cabin activity detection device from a first sensor of a plurality of sensors; performing, by the cabin activity detection device, local analysis of the first sensor data to make a determination that a condition is met; and performing a first local action based on the determination that the condition is met.

In general, in one aspect, the invention relates to a system for cabin activity detection. The system includes a cabin activity detection device. The cabin activity detection device includes a first sensor of a plurality of sensors configured to receive first sensor data and a local analysis engine. The local analysis engine is configured to receive the first sensor data from the first sensor and perform a local analysis of the first sensor data to make a determination that a condition is met. The cabin activity detection device is configured to perform a first local action based on the determination that the condition is met.

In general, in one aspect, the invention relates to a non-transitory computer readable medium including instructions that, when executed by a computer processor, perform a method. The method includes receiving first sensor data at a cabin activity detection device from a first sensor of a plurality of sensors; performing, by the cabin activity detection device, local analysis of the first sensor data to make a determination that a condition is met; and perforating a first local action based on the determination that the condition is met.

Other aspects of the invention will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 5.1 and FIG. 5.2 show a computing system in accordance with one or more embodiments of the invention.

DETAILED DESCRIPTION

Figure 1:
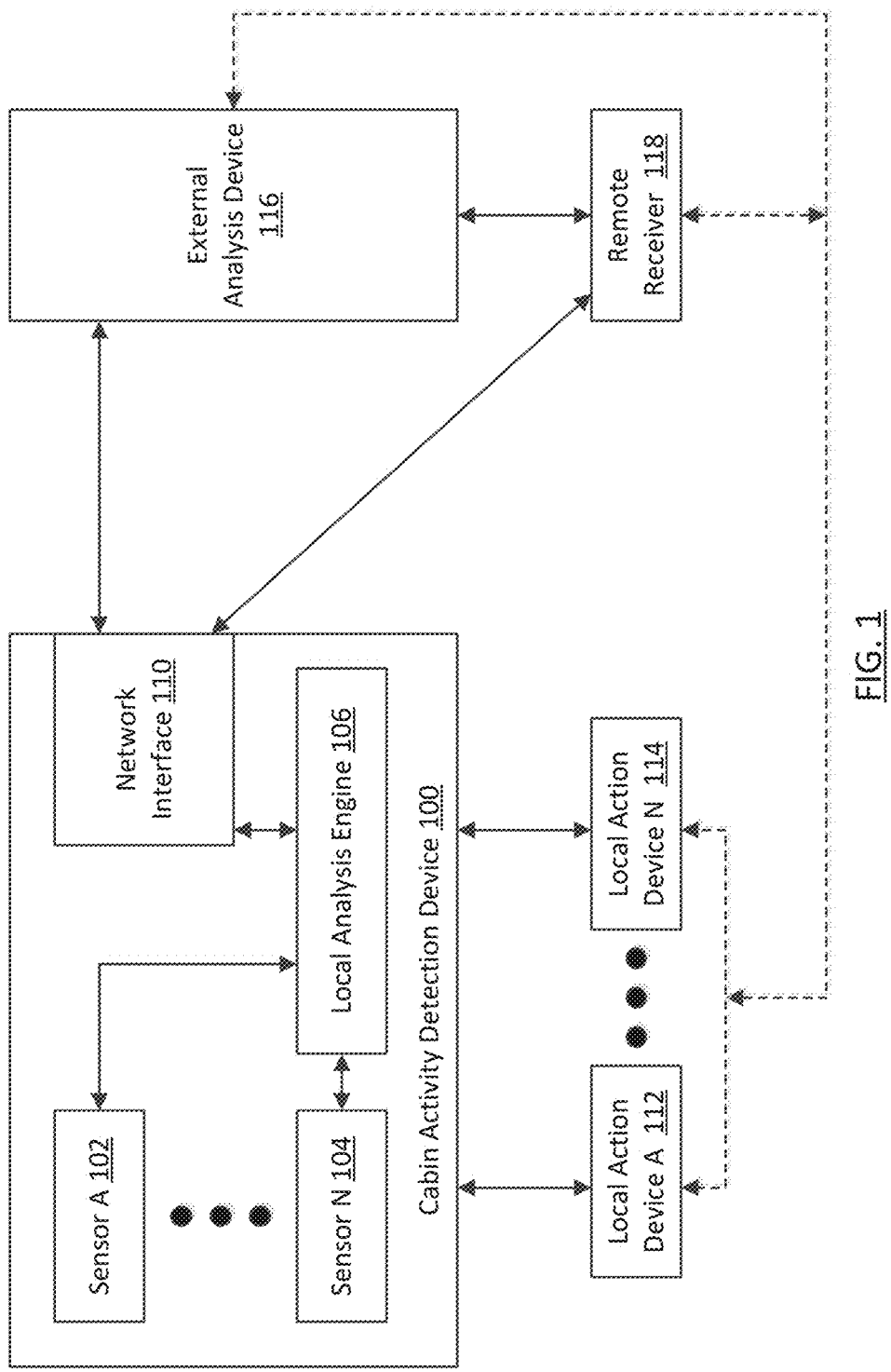
FIG. 1 shows a system in accordance with one or more embodiments of the invention.

Specific embodiments will now be described with reference to the accompanying figures. In the following description, numerous details are set forth as examples of the invention. It will be understood by those skilled in the art, and having the benefit of this Detailed Description, that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method, system, and non-transitory computer readable medium for detection of activity in the cabin of a vehicle. Specifically, in one or more embodiments of the invention a vehicle includes a cabin activity detection device that includes and/or is operatively connected to one or more sensors. In one or more embodiments of the invention, the sensors provide sensor data to the cabin activity detection device. The cabin activity detection device may process the data locally and, if certain thresholds and/or threshold combinations are met, perform and/or cause some action locally (e.g., rolling down the windows of the cabin).

In one or more embodiments of the invention, one of the sensors may be configured to provide data (e.g., audio data items) that may require additional analysis by an external analysis device. In such embodiments, the cabin activity detection device may perform some amount of local processing to determine if a pre-emptive condition is met. In one or more embodiments of the invention, if the pre-emptive condition is met, the data is sent to the external analysis device. In one or more embodiments of the invention, the external analysis device performs additional analysis on the data and, if one or more additional conditions are met, takes an action. Examples of actions include, but are not limited to, sending alert to a mobile device of a user, causing the cabin activity detection device to perform or cause a local action at the vehicle, alerting local authorities, etc.

FIG. 1 shows a system in accordance with one or more embodiments of the invention. As shown in FIG. 1, the system includes a cabin activity detection device (100), local action devices (e.g., local action device A (112), local action device N (114)), an external analysis device (116), and a remote receiver (118). The cabin activity detection device may include sensors (e.g., sensor A (102), sensor N (104)), a local analysis engine (106), and a network interface (110). Each of these components is described below.

In one or more embodiments of the invention, the cabin activity detection device (100) is a computing device. In one or more embodiments of the invention, a computing device is any device and/or any set of devices (e.g., a distributed computing system) capable of electronically processing instructions, serially or in parallel, and that includes at least the minimum processing power (not shown), memory (not shown), input and output device(s), operatively connected storage device(s) (not shown) and/or network connectivity in order to contribute to the performance of at least a portion of the functions described herein. Examples of computing devices include, but are not limited to: mobile devices (e.g., plug computer, laptop computer, smart phone, personal digital assistant, tablet computer, and/or any other mobile computing device), one or more microcontrollers, one or more server machines, one or more virtual machines (VMs) (e.g., executing in an execution environment provided by computer hardware and software of a vehicle), desktop computers, and/or any other type of computing device with the aforementioned minimum requirements. A computing device may include, but is not limited to, one or more of the following: a field programmable gate array (FPGA), an application specific integrated circuit (ASIC), a general purpose processor, a special purpose processor (e.g., a graphics processing unit (GPU)), a digital signal processor (DSP), and/or any other component for processing instructions (e.g., instructions for analyzing sensor data).

The cabin activity detection device (100) may be a standalone computing device that is operatively connected to various components and/or computing devices of a vehicle, or may be an integrated portion of such components and/or computing devices of a vehicle. In one or more embodiments of the invention, the cabin activity detection device (100) includes functionality for execution of an operating system (not shown) that manages the hardware and software of the cabin activity detection device (100) and may provide an execution environment for any number of other software instances and hardware interfaces in order to perform at least a portion of the functionality described herein.

In one or more embodiments of the invention, the cabin activity detection device (100) is operatively connected to a remote power source (e.g., an automobile battery) (not shown). In other embodiments the cabin activity detection device (100) includes a local power source (not shown). In still other embodiments of the invention, the cabin activity detection device (100) includes functionality to use both external and internal power sources, depending on the device's power requirements. In one or more embodiments of the invention, the cabin activity detection device (100) includes functionality to operate in two or more power modes. For example, the cabin activity detection device (100) may have a default low power mode while the vehicle is off, and the ability to transition to a higher power mode when possible cabin activity is detected in order to perform at least a portion of the functionality described herein (e.g., analysis of data from the one or more sensors that may have detected cabin activity).

In one or more embodiments of the invention, the cabin activity detection device (100) includes one or more sensors (102, 104). In one or more embodiments of the invention, a sensor (102, 104) is any one or more apparatuses capable of receiving data about a given environment, and transmitting the data to a consumer of the data (e.g., a local analysis engine (106)).

In one or more embodiments of the invention, all sensors (102, 104) are included in the cabin detection device (100). In other embodiments of the invention, the sensors are external to (not shown) and operatively connected to the cabin activity detection device (100). Such connections may be wired or wireless (e.g., via. Bluetooth Low Energy). In still other embodiments, some sensors (102, 104) are included in the cabin activity detection device (100) while other sensors are external to and operatively connected to the cabin activity detection device (100).

Examples of sensors (102, 104) include, but are not limited to, audio sensors (e.g., micro-electrical mechanical system (MEMS) microphones), car state detectors (e.g., ignition on/off detectors, keys present detector, etc.), temperature sensors, accelerometers, gyroscopes, proximity sensors, timing devices for measuring time passage, beacon radio receivers, chemical detectors (e.g., carbon monoxide detector), current sensors, voltage detectors, resistance sensors, capacitive sensors, pressure sensors (e.g., piezo-electric sensors), etc. The cabin activity detection device (100) may include and/or be operatively connected to any number of sensors (102, 104) without departing from the scope of the invention.

As a non-limiting example, if a sensor e.g., sensor A (102)) is an audio sensor, in one or more embodiments of the invention, the audio sensor may include a single microphone oriented towards the interior of the cabin of a vehicle. In other embodiments the audio sensor may include any number of microphones (e.g., three) each oriented along a different axis and pointing towards a different part of a vehicle. In such other embodiments, a portion of the microphones may be optionally turned off when detecting cabin audio in order to use the microphone best oriented to detect cabin audio. Additionally or alternatively, the additional microphones may be identified (e.g., using accelerometers to determine the direction of the front of the vehicle relative to the cabin activity detection device (100)), and then used to perform noise canceling functions to improve the audio detection of the microphone best oriented towards the cabin in which audio activity is being detected. In a multiple-microphone audio sensor, as described above, each microphone may be included as a part of the cabin activity detection device (100), each microphone may be separate from and operatively connected to the cabin activity detection device (100), or some of the microphones may be part of the cabin activity detection device (100) while other microphones are separate from and operatively connected to the cabin activity detection device (100).

In one or more embodiments of the invention, the sensors (102, 104) are operatively connected to a local analysis engine (106) of the cabin activity detection device (100). In one or more embodiments of the invention, the local analysis engine (106) include at least a portion of the processing capacity (e.g., circuitry) of the cabin activity detection device (100), as well an appropriate amount of memory (not shown) and/or storage (not shown) to perform the functionally described herein. For example, the local analysis engine (106) may include a circuit system that includes an ASIC, some amount of random access memory (RAM), and some amount of read-only memory or other storage medium, along with other components (e.g., wiring).

In one or more embodiments of the invention, storage (not shown) included in and/or accessible to the local analysis engine includes functionality to store data for use in local analysis of data received from sensors. For example, the storage may include audio related data for use in analyzing and/or comparing to data received from an audio sensor. As another example, the storage may include data related to various thresholds and conditions against which received sensor data is to be tested and/or compared.

In one or more embodiments of the invention, the local analysis engine (106) includes functionality to receive sensor data from the sensors (102, 104) and perform some amount of processing on the data (e.g., comparison with data from a storage device) in order to determine if any action should be taken. Actions that might be taken include, but are not limited to, taking a local action (e.g., honking a horn in a prescribed pattern, playing an audio message, turning on the vehicle and the vehicle air-conditioning, rolling down the windows, unlocking the doors, opening a sunroof, setting off the vehicle alarm, etc.), sending at least some of the sensor data to an external analysis device (116) (descried below) for further analysis, and/or some combination of local actions and sending the sensor data.

In one or more embodiments of the invention, the local analysis engine (106) is operatively connected to a network interface (110) included in the cabin activity detection device (100). In one or more embodiments of the invention, a network interface (110) is any interface that allows for a computing device to connect, wired or wirelessly, directly or indirectly, to a network. In one or more embodiments of the invention, a network (not shown) is a collection of one or more network devices (not shown) that facilitate network connectivity for one or more operatively connected devices (e.g., cabin activity detection device (100), external analysis device (116), remote receiver (118), etc.). In one or more embodiments of the invention, the network may be all or a portion of a computer network. A computer network may include a wide area network, a local area network, a wireless network, a cellular network, a satellite network, a datacenter network, any combination of such networks, and/or any other suitable network that facilitates the exchange of information from one part of the network to another. In one or more embodiments of the invention, the network may be coupled with or overlap with the Internet.

In one or more embodiments of the invention, the network interface (110) includes hardware (e.g., circuitry), software, firmware, or any combination thereof. In one or more embodiments of the invention, the network interface (110) provides functionality for the cabin activity detection device (100) to interface with other devices by implementation of one or more protocols (transmission control protocol (TCP), Internet protocol (IP), routing protocols, hypertext transport protocols, etc.), which may be arranged in one or more layers to facilitate packaging of data to be transmitted via the network. In one or more embodiments of the invention, the network interface (110) includes functionality to connect with a mobile and/or cellular network using any type of mobile or cellular technology implementation. Examples of such technologies include Global System for Mobile communications (GSM), code division multiple access (CDMA), satellite links, any long term evolution (LTE) standard related technology, Universal Mobile Telecommunications System (UMTS), or any other cellular or mobile network technology.

In one or more embodiments of the invention, instead of providing a direct connection to a network, the network interface (110) implements an interface technology (e.g., Bluetooth low-energy) to interface with some other device or set of devices of a vehicle (or outside the vehicle) (not shown) that is/are connected to a network, thereby providing network access to the cabin activity detection device (100) indirectly. Such a scenario may create a mesh of devices that work together to provide network access to one or more devices of the mesh.

In one or more embodiments of the invention, the cabin activity detection device (100) is operatively connected to one or more local action devices (e.g., local action device A (112), local action device N (114)). In one or more embodiments of the invention, a local action device (112, 114) is any device that includes functionality for causing an action related to the vehicle to occur. Examples of local action devices (112, 114) include, but are not limited to, the on-board computer of a vehicle, the audio system of a vehicle, the power window system of a vehicle, the power lock system of a vehicle, opening a sunroof, setting off the vehicle alarm, any combination thereof, etc.

In one or more embodiments of the invention, local action devices (112, 114) include functionality to perform local actions in relation to the vehicle. In such embodiments, the local action devices (112, 114) may perform such action based on direction or instruction from the cabin activity detection device (100), or a remote device (e.g., remote receiver (118)), and/or an external analysis device (116). As discussed above, examples of local actions include, but are not limited to, honking the horn in a prescribed pattern, playing an audio message, turning on the vehicle and air-conditioning, rolling down the windows, unlocking the doors, opening a sunroof, setting off the vehicle alarm, etc.

In one or more embodiments of the invention, the cabin activity detection device (100) is operatively connected (e.g., via a network) to an external analysis device (116). In one or more embodiments of the invention, the external analysis device (116) is a computing device. In one or more embodiments of the invention, the external analysis device (116) may be substantially similar to any one or more of the various computing device types discussed above in the description of the cabin activity detection device (100). In one or more embodiments of the invention, the external analysis device (116) is part of public and/or private cloud computing system. In one or more embodiments of the invention, the external analysis device (116) is one or more computing devices located in a data center (not shown).

In one or more embodiments of the invention, the external analysis device (116) includes functionality to analyze received sensor data, make requests (e.g., approval requests), or perform any other computing tasks relevant to the analysis of sensor data. In one or more embodiments of the invention, the external analysis device (116) includes functionality to perform analysis of sensor data that is more computationally intensive than analysis that may be performed by the cabin activity detection device (100) (e.g., due to having more computational resources available). For example, the external analysis device (116) may include and/or have access to one or more of a convolutional neural network, a self-organizing map, a deep belief neural network, or any suitable classification algorithm, that have been trained to classify sensor data using a broad variety of training data of each type of data, and to use such resources during analysis of sensor data.

In one or more embodiments of the invention, the external analysis device (116) includes functionality to instruct the cabin activity detection device (100) to invoke one or more local actions in response to performing analysis of received sensor data. In one or more embodiments of the invention, the external analysis device (116) is optionally operatively connected to one or more local action devices (112, 114) of a vehicle in order to cause, at least in part, one or more local actions in response to analysis of received sensor data without making use of the cabin activity detection device (100) to cause such actions.

In one or more embodiments of the invention, the external analysis device (116) is operatively connected to a remote receiver (118). In one or more embodiments of the invention, a remote receiver (118) is any entity or device that the external analysis device (116) communicates with in the event received sensor data is analyzed and one or more thresholds or conditions are met (i.e., an alert is sent from the external analysis device (116) to the remote receiver (118)). For example, if the sensor data received from a cabin activity detection device is analyzed, and it is determined that the interior temperature of a vehicle exceeds a certain threshold, the vehicle is off, and an audio analysis determines a puppy is barking in the vehicle, the external analysis device (116) may be configured to communicate with a remote receiver (118) by sending an alert. In one or more embodiments of the invention, the remote receiver (118) also receives from the external analysis device (116) at least a portion of the analyzed sensor data (e.g., an audio data item of the puppy barking).

In one or more embodiments of the invention, the remote receiver (118) is a device of a user. A user may be an owner of a vehicle, anyone with a relation to the vehicle or its owner, an operator of a vehicle, or anyone else that may be in a position to take action in response to receiving an alert from the external analysis device (116). A device of a user may be any device (e.g., a computing device) in possession of and/or accessible to a user that is capable of receiving an alert from the external analysis device (116).

For example, the user may be an owner of an automobile who is also the primary driver of the automobile and an owner of a puppy. The user possesses a smart phone (i.e., the remote receiver (118)) that is configured to receive an alert when the external analysis device (116) determines that a set of thresholds and/or conditions are met. Continuing the example from above, the smart phone of the user may receive an alert (e.g., "your puppy is still in the car and it's getting hot!") when the external analysis device (116) determines that the automobile is off, the temperature passed a threshold, and the puppy is inside of the car and barking.

In one or more embodiments of the invention, the remote receiver (118) is a device (e.g., a computing device) of some other entity, such as local authorities (e.g., police or medical personnel). For example, in certain situations, the external analysis device (116) may be further configured to determine that certain thresholds and/or conditions have persisted for a threshold amount of time after alerting a device of a user and, in response to such a determination, alert appropriate device of a police force or other emergency response entity.

In one or more embodiments of the invention, the remote receiver (118) is operatively connected to the cabin activity device (100) (e.g., via a network) and/or optionally operatively connected to one or more local action devices (112, 114). In one or more embodiments of the invention, such connections may facilitate the remote receiver causing, at least in part, the occurrence of one or more local actions. For example, in a scenario such as the puppy-in-car example above, the user/owner may user their smart phone to actuate, via communication with the cabin activity detection device, a partial roll down of one or more cabin windows (or opening of a sunroof) of the automobile in order to provide relief to the puppy until the owner can return to the vehicle to retrieve the puppy. Such actions may be additionally or alternatively actuated via an optional operative connection between the remote receiver (118) and the one or more local action devices (112, 114).

While FIG. 1 shows a configuration of components, other configurations may be used without departing from the scope of the invention. For example, various components may be combined to create a single component. As another example, the functionality performed by a single component may be performed by two or more components. In one or more embodiments of the invention, one or more of the modules and elements shown in FIG. 1 may be omitted, repeated, and/or substituted. Accordingly, embodiments of the invention should not be considered limited to the specific arrangements of components and elements shown in FIG. 1.

Figure 2:
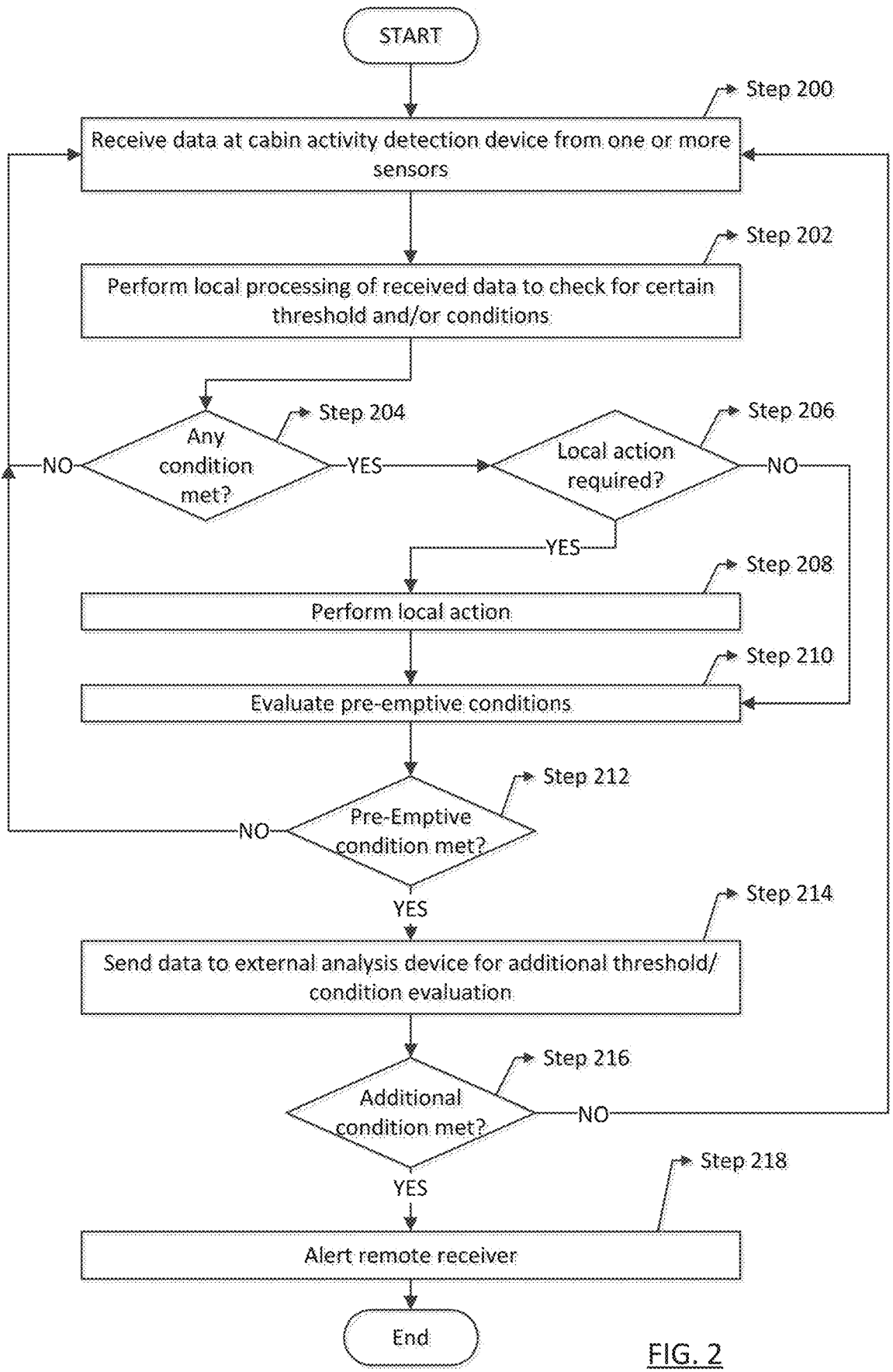
FIG. 2 shows a flowchart in accordance with one or more embodiments of the invention.
Figure 3:
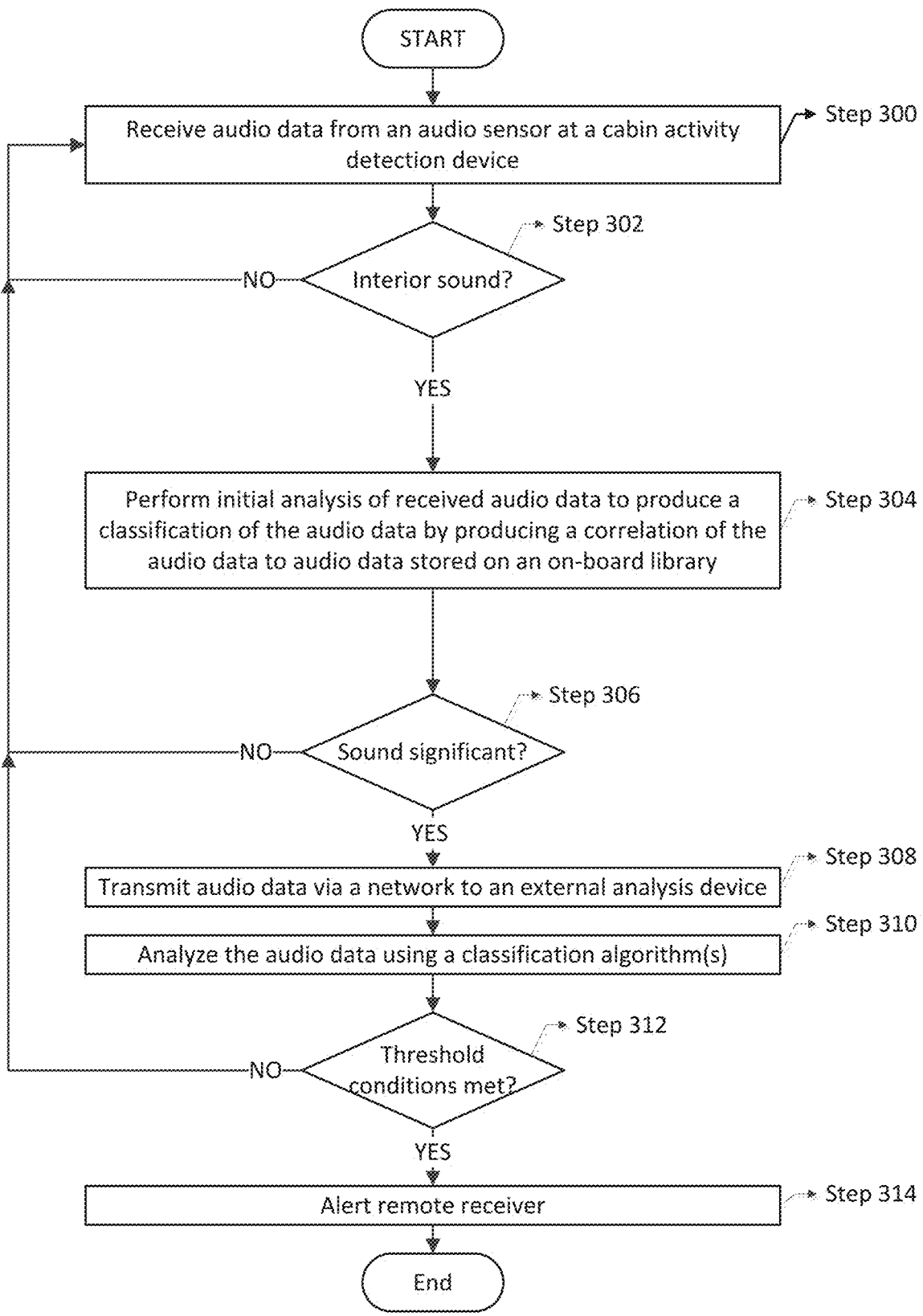
FIG. 3 shows a flowchart in accordance with one or more embodiments of the invention.

FIG. 2 and FIG. 3 show flowcharts in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2A shows a flowchart describing a method for detecting cabin activity in accordance with one or more embodiments of the invention.

In Step 200, sensor data from one or more sensors are received at a cabin activity detection device. In one or more embodiments of the invention, the sensor data is received by sensors that are included in the cabin activity detection device and/or via wired or wireless transmission from one or more operatively connected sensors. Sensor data received may include, but is not limited to: audio data from one or more microphones; ambient temperature data related to the temperature inside the cabin; time data from a timer that tracks the duration of, or duration since, detected cabin activity. In one or more embodiments of the invention, receipt of sensor data may cause a cabin activity detection device to transition from a lower power mode to a higher power mode.

In Step 202, local processing of the sensor data received in Step 200 is performed. In one or more embodiments of the invention, the received sensor data is analyzed to determine of any thresholds and/or conditions, or combinations thereof, are met. Examples of such thresholds and conditions include, but are not limited to: whether a vehicle is on or off; the duration of a vehicle being off; whether temperature is rising; whether temperature is falling; whether temperature has exceeded a threshold; whether temperature has fallen under a certain threshold; whether or not any audio activity has been detected in the cabin; whether or not an item (e.g., baby seat, pet collar; briefcase, purse, car keys, etc.) are or are not proximate to the vehicle; etc. Analysis of the data may include obtaining relevant stored data related to the threshold or condition, and comparing the received sensor data with the obtained threshold or condition data. For example, the cabin activity detection device may store a temperature threshold of 85 degrees Fahrenheit. When sensor data from a temperature sensor is received from a temperature sensor, the received temperature data may be compared with the threshold data to determine if the threshold has been exceeded. The description of FIG. 3, below, includes additional discussion of local analysis of sensor data, specifically audio sensor data.

In Step 204, a determination is made as to whether any threshold or combination of thresholds has been met that would require an action. An example of a combination of thresholds being met is that the ignition has been off for 30 seconds (determined using time sensor data), and the beacon assigned to the brief case is still in proximity to the vehicle (determined using proximity sensor data). If no threshold or condition, or combination thereof, has been met, the process returns to Step 200 to receive additional sensor data. In one or more embodiments of the invention, the device may transition back to a lower power state if no additional sensor data is received for a period of time. If, however, any threshold or condition, or combination thereof, is met, the process proceeds to Step 206.

In Step 206, a determination is made as to whether a local action is required. In one or more embodiments of the invention, a local action may be configured as required when certain thresholds, conditions, or combinations are met. As an example, if a local analysis of audio data determines that the sound of shattering glass has been detected, the cabin activity detection device may be configured to cause the audio system of the vehicle to play a recorded warning message. If a local action is required, the process continues to Step 208. Otherwise the process continues to Step 210.

In Step 208, the required local action is performed. The local action may be performed using any component of the vehicle that may be activated/used/invoked by the cabin activity detection device. As discussed above in the description of FIG. 1, examples of local actions include, but are not limited to, honking the horn in a prescribed pattern (which may require the physical horn), playing an audio message (which may require, for example, the stereo), turning on the vehicle and air-conditioning (which may include, for example, using the ignition system, vehicle computer, and vehicle air conditioning system), rolling down the windows or opening a sunroof (which may include using the power window system), unlocking the doors (which may include using the power lock system), and setting off a vehicle alarm (which may include using the vehicle alarm system).

Next, if either a local action was performed in Step 208, or a determination that no such local action was needed occurred in Step 206, in Step 210, received sensor data is further analyzed to determine if a pre-emptive condition is met. In one or more embodiments of the invention, evaluation of pre-emptive conditions includes obtaining data from storage included in or operatively connected to the cabin activity detection device. An exemplary basic pre-emptive condition that may be tested is whether any received sensor data requires that a remote party (such as a vehicle owner, operator, or related entity) should be alerted in regards to the sensor data. For example, if a vehicle has been off for thirty seconds, and a beacon assigned to a brief case is still in the car, then a pre-emptive condition is met that a user should be alerted that the brief case remains in the vehicle. Another example of a pre-emptive condition is that local analysis yielded a result that indicates additional analysis is necessary that is beyond the capability of the cabin activity detection device. For example, a more simple analysis of data received from an audio sensor may yield a correlation with locally stored data that is close enough (e.g., meets a correlation threshold) to warrant more detailed and/or comprehensive analysis by a remote device. Analysis of audio data is discussed further in the description of FIG. 3, below.

In Step 212, after evaluating the possible pre-emptive conditions in Step 210, a determination is made as to whether any one or more pre-emptive conditions are met. If a pre-emptive condition is not met, the process returns to Step 200 to await receipt of additional sensor data. In one or more embodiments of the invention, the cabin activity detection device returns to a lower power state if no additional sensor data is received for a period of time. If a pre-emptive condition is met, the process proceeds to Step 214.

In Step 214, data is sent to an external analysis device for further analysis. In one or more embodiments of the invention, the cabin activity detection device sends the request for additional analysis, along with relevant sensor data, to the external analysis device via a network, or indirectly via other devices that are connected to a network. For example, if sending via a wireless cellular network, the data to be sent may be collected, divided into appropriate payload sizes appended with appropriate transport layer data for re-assembly by the external analysis device. The data is then packaged into an IP packet, placed into a link layer frame, and is then transmitted out of a network interface to the cellular network, which propagates the data to towards the external analysis device.

In Step 216, a determination is made whether additional conditions or thresholds, or a combination thereof, are met. In a relatively simple example, the analysis may be a verification that audio activity was detected in the cabin based on audio data from a single microphone. In a relatively more complex example, the external analysis device may verify that the data demonstrates that the car is no longer moving (e.g., using accelerometer data), that the keys remain in the ignition, and that a beacon assigned to a purse has moved a pre-configured distance from the vehicle. In a relatively still more complex example, the external analysis device may assess that a temperature threshold has been reached, the vehicle has been off for a pre-configured time threshold, and audio activity has been preliminarily detected by the cabin activity detection device to be audio activity of a cat (e.g., a series of meow events). In such an example, the external analysis device may then perform additional analysis of the audio data to verify that it is indeed audio data from a cat in the cabin of the vehicle. In one or more embodiments of the invention, if an additional condition is not met, the process returns to Step 200 until additional sensor data is received by the cabin activity detection device. If, however, it is determined that an additional condition, threshold, or combination thereof has been met, the process proceeds to Step 218.

In Step 218, the external analysis device alerts a remote receiver. In one or more embodiments of the invention, the alert may be sending, via a network, an alert to a device (e.g., a mobile computing device) of a person related to the vehicle in some way. For example, the owner of the vehicle may be the driver of the vehicle, and the alert may go to the owner's smart phone to alert them of the cabin activity (e.g., "you left your brief case", "your cat is still in the car", "the car is still on but your purse is no longer in the car", etc.). In one or more embodiments of the invention, the alert may be sending a message to local authorities to alert them of the cabin activity. For example, a child may be in a car that is becoming too cold, and no one has responded to alerts sent to mobile devices of the vehicle owner and/or related entities. In such a situation, the police may be alerted to investigate whether the child is in need of rescue.

If the alert goes to a device of a user related to the vehicle, the user may respond by communicating with either the cabin activity detection device or local action devices to cause a local action to occur, such as turning on the car and the air conditioning remotely. Local authorities may or may not have similar capabilities. In one or more embodiments of the invention, the alert may prompt a user and/or local authorities to travel to the location of the vehicle to take appropriate action.

FIG. 3 shows a method of cabin audio activity collection, classification, and analysis in accordance with one or more embodiments of the invention.

In Step 300, audio data is received from an audio sensor at a cabin activity detection device. In one or more embodiments of the invention, the audio sensor is a single microphone. In other embodiments of the invention, the audio sensor is a set of microphones. In such embodiments, as described above, the microphones may all be included in the cabin activity sensor device, or some or all of the microphones may be separate from and operatively connected to the cabin activity detection device.

In Step 302, a determination is made as to whether the audio activity is from an interior (i.e., inside the cabin) source, or from an exterior source (i.e., outside the cabin). In a configuration with one microphone, this may be performed by determining that the volume of the sound exceeds a certain threshold. In configurations with multiple microphones, in one or more embodiments of the invention, the microphone oriented towards the cabin is known. The cabin-pointed microphone may be known because a vehicle manufacturer installed the cabin activity detection device in a pre-determined manner. The cabin-pointed microphone may be known because of a previous analysis in which accelerometers of the cabin activity detection device were used to determine which direction was the front of the vehicle (i.e., the frontal direction), and such information was used along with the known relative orientation of the multiple microphones to determine which microphone was oriented towards the cabin (i.e., the cabin-facing microphone), Knowing which of the multiple microphones is oriented towards the cabin allows an analysis of the volume of the multiple microphones to determine that the audio activity is occurring inside the cabin. Though not shown in FIG. 3, once the audio has been determined to be interior audio activity, the other microphones may be turned off to focus on the microphone oriented toward the cabin. Alternatively, the audio data from the other microphones may be used to perform noise cancellation to filter out any exterior sounds they may be detecting, which may help prevent interference and/or false-positives from outside the vehicle.

If the sound is not determined to be an interior sound, the process returns to Step 300 to await the receipt of other audio data. If the sound is determined to be audio activity from inside the cabin, the process proceeds to Step 304.

In Step 304, an initial analysis of the received audio data is performed to produce a classification of the audio data to filter out any audio data that is not significant (e.g., does not require any further analysis). In one or more embodiments of the invention, such analysis is performed by comparing the data to an on-board library of audio data included with and/or accessible to the cabin activity detection device.

A non-limiting example of such an analysis being performed is as follows, First, the cabin activity detection device applies a fast-Fourier transform on the audio data to produce a histogram of frequencies for each time slice of the audio data. Next, the frequency histograms are arranged in a vector and normalized, Next, the cabin activity detection device obtains samples of data from an on-board library of frequency histogram vectors for each significant event type, including, but not limited to, the sounds of children, pets, car alarms, sirens, hail, and glass breaking. Next, the cabin activity detection device computes the dot product of the frequency histogram vector with each of the library samples, to arrive at a similarity scalar for each sample. The similarity scalar shows a correlation of the vectors on a scale of negative one to one.

In Step 306, a determination is made whether the audio data represents a significant sound. In one or more embodiments of the invention, a sound is significant if it matches any stored sample above a configured threshold, Continuing the example above, audio data that does not have similarity close enough to one is discarded the sound is not considered significant, while audio data with a similarity close enough to one is considered potentially significant and warrants further analysis. If the sound is not found to be significant, the process returns to Step 300 to wait for receipt of additional audio data. If the sound is determined to be significant, the process proceeds to Step 308.

In Step 308, the audio data is transmitted, via a network, to an external analysis device for further analysis. For example, the audio data may be transmitted over the air via a cellular network to a data center in which the external analysis device is located.

In Step 310, additional analysis is performed on the audio data by the external analysis device. In one or more embodiments of the invention, the audio data is first presented to a system of one or more of a convolutional neural network, a self-organizing map, a deep belief neural network, and/or any other suitable classification algorithm, that have been trained to classify audio data using a broad variety of training data of each type of data. In one or more embodiments of the invention, each contributing algorithm in the system may conclude the noise is significant or insignificant, and/or classify the noise according to pre-determined categories. In one or more embodiments of the invention, the results are integrated into a probability vector representing the likelihood that the audio data belongs to any class or none of the classes of audio data.

In Step 312, a determination is made as to whether any condition or threshold related to audio data is met. In one or more embodiments of the invention, if any member of the probability vector created in Step 310 shows a close enough correlation with a class of audio data, then the condition is met. If the condition is not met, the process returns to Step 300 to await additional audio data. If the condition is met, the process proceeds to Step 314.

In Step 314, a remote receiver is alerted. In one or more embodiments of the invention, the alert of the remote receiver requires that other conditions are met besides audio data conditions, such as the car being off, the temperature rising, etc. In one or more embodiments of the invention, the alert of the remote receiver in Step 314 is substantially similar to the alert of the remote receiver in Step 218 of FIG. 2.

Figure 4:
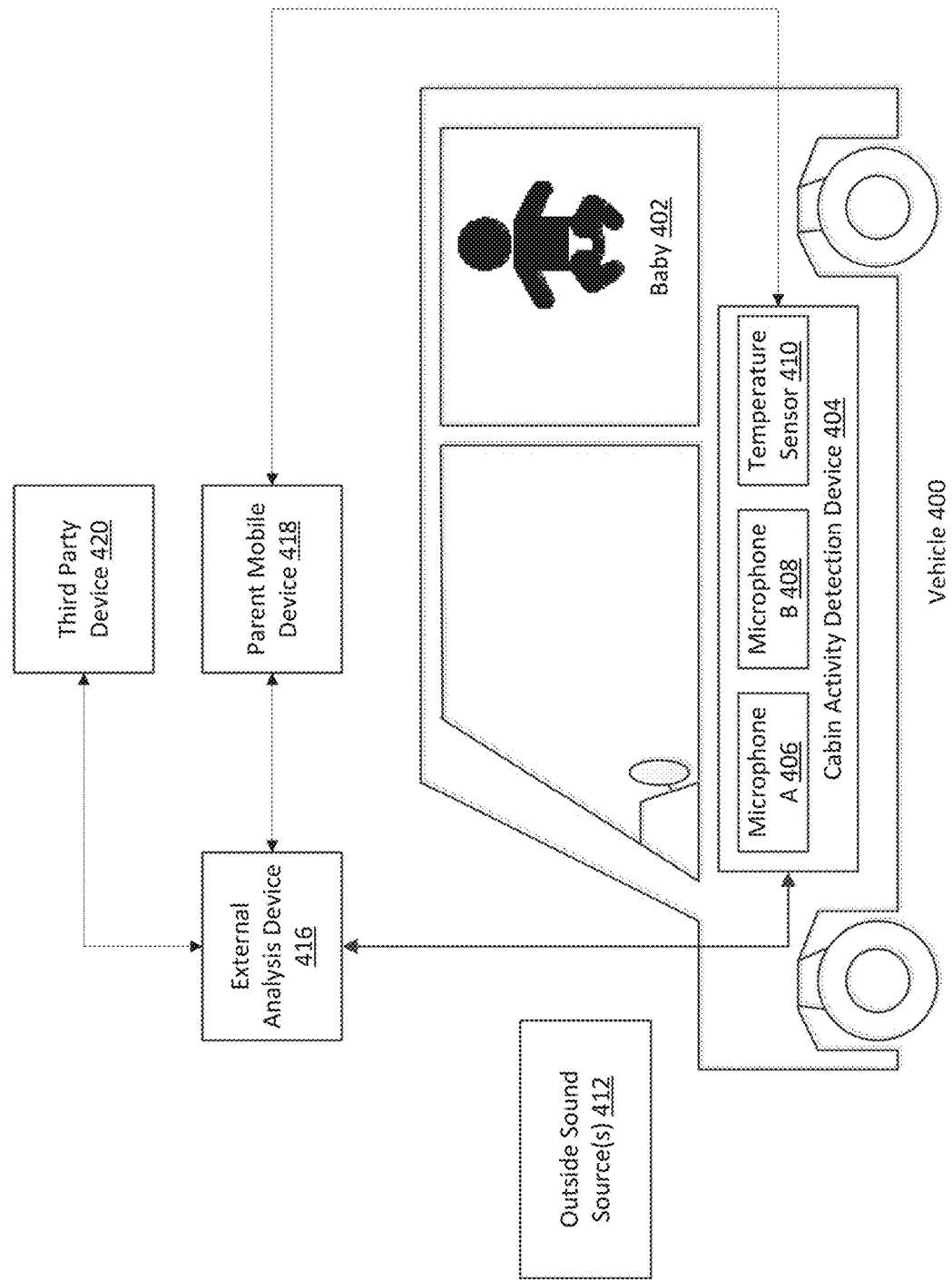
FIG. 4 shows an explanatory example in accordance with one or more embodiments of the invention.

FIG. 4 shows an example in accordance with one or more embodiments of the invention. The following example is for explanatory purposes only and not intended to limit the scope of the invention.

Referring to FIG. 4, consider a scenario in which a mother (not shown) has driven a vehicle (400) to a shopping mall (not shown) with a baby (402) in the vehicle. The vehicle (400) includes a cabin activity detection device (404) that includes microphone A (406), microphone B (408), a temperature sensor (410), a timer (not shown), and a vehicle on/off sensor (not shown). The cabin activity detection device is connected via a cellular network (not shown) to an external analysis device (416). The external analysis device is operatively connected, via a network, to a mobile device of the mother (418), and to a police device (420). Additionally, the environment includes outside sound sources (412).

Prior to the trip to the mall, on another trip by the mother, the cabin activity detection device (404) used its accelerometers (not shown) to determine where the front of the vehicle was, and then used that knowledge, in addition to knowledge of the relative orientation of the microphones (406, 408) to determine that microphone B (408) was oriented towards the cabin. This allowed microphone A (406) to be used for noise cancellation in future interior-of-the-cabin audio activity detection events.

In such a scenario, the mother arrives at the mall and exits the vehicle (400), accidentally leaving behind the baby (402). As the temperature starts to rise in the cabin of the vehicle (400), the baby (402) begins to cry. The receipt of audio sensor data from the microphones (406, 408) causes the cabin activity detection device (404) to transition to a higher power state. Once in the higher power state, an initial analysis is performed on various data types received from sensors. The data from the temperature sensor (410) is compared with stored temperature threshold data to determine that the temperature in the cabin (88 degrees Fahrenheit) exceeds the stored threshold of 85 degrees Fahrenheit. Additionally, after implementing noise cancellation with microphone A (406) data, an initial analysis histogram of the of the audio data from microphone B (408) relative to stored histogram frequency vectors yields a correlation relatively close to the stored histogram of children crying.

Accordingly, the audio data, temperature data, time data, and vehicle on/off sensor data is sent to an external analysis device for further analysis. At this time, no local actions are determined to be required.

Next, the external analysis device determines, based on the received data, that the vehicle (400) is indeed off (e.g., condition 1), that it has been off for more than one minute (e.g., threshold 1), that the temperature threshold has indeed been breached (e.g., threshold 2), and, via use of several classification algorithms, that the audio data does indeed demonstrate that a baby (402) is crying in the interior of the vehicle (400) (condition 2). Based on threshold 1, threshold 2, condition 1, and condition 2 being met, the external analysis device (416) sends an alert to the mother's mobile device alerting her that her child is crying in a hot vehicle (400) that has been off for over one minute.

In response to the alert, the mother hurries back to the car and obtains her baby (402). Thus tragedy has been averted. If however, the mother had not responded to the condition, and the cabin activity detection device (404) had continued to detect the scenario described above for more than ten minutes, then the external analysis device would have alerted a device of the local police (420) so that they might rescue the baby (402).

Embodiments of the invention may be implemented on a computing system (e.g., computing device). Any combination of mobile, desktop, server, router, switch, embedded device, or other types of hardware may be used. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5.1 may be connected to or be a part of a network. For example, as shown in FIG. 5.2, the network (520) may include multiple nodes (e.g., node X (522), node Y (524)). Each node may correspond to a computing system, such as the computing system shown in FIG. 5.1, or a group of nodes combined may correspond to the computing system shown in FIG. 5.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5.2, a node may correspond to a blade in a server chassis that is connected to other nodes via a backplane. By way of another example, a node may correspond to a server in a data center. By way of another example, a node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and/or transmit responses to the client device (526). The client device (526) may be a computing system, such as the computing system shown in FIG. 5.1. Further, the client device (526) may include and/or perform all or a portion of one or more embodiments of the invention.

The computing system or group of computing systems described in FIGS. 5.1 and 5.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process.

Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer. Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the tokens associated with the node(s) matching the extraction criteria are extracted. The extraction criteria may be as simple as an identifier string or may be a query presented to a structured data repository (where the data repository may be organized according to a database schema or data format, such as an eXtensible Markup Language (XML)).

The extracted data may be used for further processing by the computing system. For example, the computing system of FIG. 5.1 or a node of FIG. 5.2, while performing one or more embodiments of the invention, may perform data comparison. Data comparison may be used to compare two or more data values (e.g., A, B).

The computing system in FIG. 5.1 may implement and/or be connected to a data repository. For example, one type of data repository is a database. A database is a collection of information configured for ease of data retrieval, modification, re-organization, and deletion.

The computing system of FIG. 5.1 may include functionality to present raw and/or processed data, such as results of comparisons and other processing.

The above description of functions presents only a few examples of functions performed by the computing system of FIG. 5.1 and the nodes and/or client device in FIG. 5.2. Other functions may be performed using one or more embodiments of the invention.

Embodiments of the invention may offer a variety of advantages. For example, using microphones and audio analysis and temperature readings, the invention can detect a broad range of conditions that may cause harm to the vehicle, the driver, a passenger, or a pet.

As another example, using information from an internal tinier and ignition condition, the device can prevent many false-positive alerts from being generated.

As another example, using information about the signal strength of one or more portable beacons, the device can detect a broad range of conditions when an item, child, pet, or effects should or should not be inside or outside the vehicle when the vehicle is started or off.

As another example, the device can quickly and immediately respond to conditions by local evaluation of conditions, without dependence or connection to any resource outside of the cabin, allowing for best possible operation no matter the weather or environmental restrictions.

As another example, the invention can detect complex conditions such as correctly classifying noises through the ability to do requests for further analysis to a remote data center.

As another example, the invention can perform sophisticated actions not as efficient or cost-effective for a local device, such as contacting a user or the authorities, or seeking approval from the user or other party.

As another example, the staged audio analysis of audio activity in the cabin may achieve much better efficiency by using a less accurate local phase and a more accurate analysis in the remote data-center, eliminating most noises without any data usage costs and yet still providing accurate results.

As another example, the ability to flexibly combine conditions, thresholds, and actions together allow the device to be adapted to new unforeseen scenarios that may arise.

As another example, the integration of one or more algorithms in audio analysis into a probability vector provides higher confidence and fewer false-positives in the classification of activities and events inside the vehicle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for cabin activity detection, the method comprising:
    receiving first sensor data at a cabin activity detection device from a first sensor of a plurality of sensors, wherein the first sensor data is audio data from an audio sensor;
    performing, by the cabin activity detection device, local analysis of the first sensor data to make a determination that a condition is met, wherein performing the local analysis comprises:
        determining that the audio data is an interior sound, wherein determining that the audio data is the interior sound comprises:
            determining, before receiving the audio data and using an accelerometer, a frontal direction of a vehicle comprising the cabin activity detection device; and
            determining that a microphone of the audio sensor is a cabin-facing microphone;
        performing an initial analysis of the audio data to generate a correlation of the audio data with each of a plurality of stored audio data items; and
        determining that the correlation of a first stored audio data item of the plurality of stored audio data items with the audio data that is above a correlation threshold; and
    performing a first local action based on the determination that the condition is met.

2. The method of claim 1, further comprising:
    receiving second sensor data at the cabin activity detection device from a second sensor of the plurality of sensors;
    performing, by the cabin activity detection device, local processing of the second sensor data to determine that a threshold combination exists based on the first sensor data and the second sensor data, the threshold combination comprising a pre-emptive condition;
    analyzing the pre-emptive condition to determine that the audio data and the second sensor data should be sent to an external analysis device; and
    sending the first sensor data and the second sensor data to the external analysis device, wherein the external analysis device performs additional analysis of the first sensor data and the second sensor data to determine that an additional condition is met and takes an action based on the additional condition being met.

3. The method of claim 2, wherein, the action comprises sending an alert to a user device of a user.

4. The method of claim 3, further comprising:
    receiving an instruction, from the user device, to perform a second local action; and
    performing, in response to the instruction, the second local action.

5. A system for cabin activity detection, the system comprising:
    a cabin activity detection device comprising:
        a first sensor of a plurality of sensors configured to receive first sensor data,
        wherein the first sensor data is audio data from an audio sensor;
        a local analysis engine configured to:
            receive the first sensor data from the first sensor; and
            perform a local analysis of the first sensor data to make a determination that a condition is met, wherein the local analysis engine, in order to perform the local analysis, is further configured to:

determine that the audio data is an interior sound, wherein the local analysis engine, in order to determine that the audio data is the interior sound is further configured to:
  determine, before receiving the audio data and using an accelerometer, a frontal direction of a vehicle comprising the cabin activity detection device; and
  determine that a microphone of the audio sensor is a cabin-facing microphone;
perform an initial analysis of the audio data to generate a correlation of the audio data with each of a plurality of stored audio data items; and
determine that the correlation of a first stored audio data item of the plurality of stored audio data items with the audio data that is above a correlation threshold,
wherein the cabin activity detection device is configured to perform a first local action based on the determination that the condition is met.

6. The system of claim 5, the local analysis engine is further configured to:
receive second sensor data at the cabin activity detection device from a second sensor of the plurality of sensors;
perform local processing of the second sensor data to determine that a threshold combination exists based on the first sensor data and the second sensor data, the threshold combination comprising a pre-emptive condition;
analyzing the pre-emptive condition to determine that the audio data and the second sensor data should be sent to an external analysis device; and
sending the first sensor data and the second sensor data to the external analysis device, wherein the external analysis device performs additional analysis of the first sensor data and the second sensor data to determine that an additional condition is met and takes an action based on the additional condition being met.

7. The system of claim 6, wherein, the action comprises sending an alert to a user device of a user.

8. The system of claim 7, wherein the cabin activity detection device is further configured to:
receive an instruction, from the user device, to perform a second local action; and
perform, in response to the instruction, the second local action.

9. A non-transitory computer readable medium comprising instructions that, when executed by a computer processor, perform a method comprising:
receiving first sensor data at a cabin activity detection device from a first sensor of a plurality of sensors, wherein the first sensor data is audio data from an audio sensor;
performing, by the cabin activity detection device, local analysis of the first sensor data to make a determination that a condition is met, wherein performing the local analysis comprises:
  determining that the audio data is an interior sound, wherein determining that the audio data is the interior sound comprises:
    determining, before receiving the audio data and using an accelerometer, a frontal direction of a vehicle comprising the cabin activity detection device; and
    determining that a microphone of the audio sensor is a cabin-facing microphone;
  performing an initial analysis of the audio data to generate a correlation of the audio data with each of a plurality of stored audio data items; and
  determining that the correlation of a first stored audio data item of the plurality of stored audio data items with the audio data that is above a correlation threshold; and
performing a first local action based on the determination that the condition is met.

10. The non-transitory computer readable medium of claim 9, wherein the method performed by execution of the instructions further comprises:
receiving second sensor data at the cabin activity detection device from a second sensor of the plurality of sensors;
performing, by the cabin activity detection device, local processing of the second sensor data to determine that a threshold combination exists based on the first sensor data and the second sensor data, the threshold combination comprising a pre-emptive condition;
analyzing the pre-emptive condition to determine that the audio data and the second sensor data should be sent to an external analysis device; and
sending the first sensor data and the second sensor data to the external analysis device, wherein the external analysis device performs additional analysis of the first sensor data and the second sensor data to determine that an additional condition is met and takes an action based on the additional condition being met.

11. The non-transitory computer readable medium of claim 10, wherein the action comprises sending an alert to a user device of a user.

12. The non-transitory computer readable medium of claim 11, wherein the method implemented by the instructions further comprises:
receiving an instruction, from the user device, to perform a second local action; and
performing, in response to the instruction, the second local action.

* * * * *